US011042975B2

(12) United States Patent
Perron et al.

(10) Patent No.: US 11,042,975 B2
(45) Date of Patent: Jun. 22, 2021

(54) ESTIMATING A NUMBER OF CONTAINERS BY DIGITAL IMAGE ANALYSIS

(71) Applicant: FLASCHEBOTTLE TECHNOLOGIES INC., Edmonton (CA)

(72) Inventors: Philippe Perron, Edmonton (CA); Yilong Zhang, Calgary (CA); Douglas Long, Calgary (CA)

(73) Assignee: FLASCHEBOTTLE TECHNOLOGIES INC., Edmonton (CA)

(*) Notice: Subject to any disclaimer, the term of this patent is extended or adjusted under 35 U.S.C. 154(b) by 203 days.

(21) Appl. No.: 16/270,397

(22) Filed: Feb. 7, 2019

(65) Prior Publication Data

US 2019/0244340 A1 Aug. 8, 2019

Related U.S. Application Data

(60) Provisional application No. 62/627,993, filed on Feb. 8, 2018.

(51) Int. Cl.
*G06T 7/00* (2017.01)
*G06K 9/00* (2006.01)
(Continued)

(52) U.S. Cl.
CPC ........ *G06T 7/0002* (2013.01); *G06K 9/00536* (2013.01); *G06K 9/00771* (2013.01);
(Continued)

(58) Field of Classification Search
CPC ............................................. G06T 2207/30242
See application file for complete search history.

(56) References Cited

U.S. PATENT DOCUMENTS

| 7,692,684 B2* | 4/2010 | Ku ........................... G07C 9/00 348/169 |
| 8,457,384 B2* | 6/2013 | Smilansky .............. G01F 22/00 382/141 |

(Continued)

FOREIGN PATENT DOCUMENTS

| CA | 2692424 A1 * | 1/2009 | ............. G06K 9/209 |
| JP | 07287763 A * | 10/1995 | ......... G06K 9/00778 |
| WO | WO-2012074359 A1 * | 6/2012 | ................ G06T 7/12 |

*Primary Examiner* — Gandhi Thirugnanam
(74) *Attorney, Agent, or Firm* — Bennett Jones LLP

(57) ABSTRACT

A computer-implemented method, a computer system, and a computer program product are provided for estimating output data that includes or is based on a number of containers, which may or may not be in receptacles. The method involves using an object detection algorithm operating on an input digital image to detect container images and receptacle images (if any), and using an estimation algorithm operating on the detected images to estimate the number of containers. Estimating the number of containers may involve counting the number of containers within different container classes, as determined by the object detection algorithm. Estimating the number of containers may involve estimating a size of a receptacle in a detected receptacle image based on analysis of a detected reference container image. A detected reference object image may be used to assist with classifying detected container images in different container classes.

9 Claims, 13 Drawing Sheets

(51) Int. Cl.
  *G06T 7/62* (2017.01)
  *G06K 9/46* (2006.01)
(52) U.S. Cl.
  CPC .............. *G06K 9/4628* (2013.01); *G06T 7/62* (2017.01); *G06T 2207/30242* (2013.01)

(56) References Cited

U.S. PATENT DOCUMENTS

| | | | | |
|---|---|---|---|---|
| 8,682,047 B2* | 3/2014 | Lang | .................... | G06K 9/3241 382/128 |
| 10,339,656 B1* | 7/2019 | Le | .............................. | G06T 7/50 |
| 2010/0158386 A1* | 6/2010 | Smilansky | ................ | G06T 7/62 382/194 |
| 2012/0308123 A1* | 12/2012 | Jo | ........................... | G06T 7/254 382/159 |
| 2012/0314059 A1* | 12/2012 | Hoffmann | ............. | G06T 7/0004 348/135 |
| 2013/0136307 A1* | 5/2013 | Yu | .............................. | G06T 7/12 382/103 |
| 2013/0251197 A1* | 9/2013 | Liu | .......................... | G06T 7/136 382/103 |
| 2014/0241581 A1* | 8/2014 | Narayanan | ................ | G06T 7/20 382/103 |
| 2016/0104297 A1* | 4/2016 | Araujo Dos Santos | ..................... | G06K 9/00771 382/103 |
| 2016/0267359 A1* | 9/2016 | Gan | .................... | G06K 9/6228 |
| 2016/0371634 A1* | 12/2016 | Kumar | ................ | G06Q 10/087 |
| 2017/0103536 A1* | 4/2017 | Wang | ................ | G06K 9/00771 |
| 2018/0253629 A1* | 9/2018 | Bamba | ................ | G06K 9/2054 |
| 2018/0285682 A1* | 10/2018 | Najibi | ................ | G06K 9/6289 |
| 2018/0286077 A1* | 10/2018 | Ikeda | ................... | G06K 9/3233 |
| 2018/0350179 A1* | 12/2018 | Yamashita | ................ | G06T 7/00 |
| 2019/0164281 A1* | 5/2019 | Lewis | ...................... | G06K 9/36 |
| 2019/0244340 A1* | 8/2019 | Perron | ................ | G06K 9/4628 |
| 2019/0303699 A1* | 10/2019 | Dwivedi | ................... | G06T 7/50 |
| 2020/0202371 A1* | 6/2020 | Mayster | ................... | G06T 7/97 |

* cited by examiner

ESTIMATING A NUMBER OF CONTAINERS BY DIGITAL IMAGE ANALYSIS

CROSS-REFERENCE TO RELATED APPLICATIONS

This application claims priority to U.S. Provisional Patent Application No. 62/627,993, the entire contents of which are incorporated by reference for all purposes, where permitted.

FIELD OF THE INVENTION

The present invention relates to computer-implemented methods, computer systems, and computer program products for estimating output data comprising a number of containers (e.g., beverage containers) or output data based on the number of containers (e.g., a monetary value of the containers) by digital image analysis. The containers may be either inside or outside of a receptacle (e.g., a bag, a box, or a bin).

BACKGROUND OF THE INVENTION

Deposit-refund programs incentivize recycling of beverage containers by taking deposits from customers at the point of sale, and refunding those deposits upon customers returning the containers to a redemption center. Customers are known to collect from dozens to thousands of containers in receptacles (e.g., bags, bins, or boxes), and transport them to redemption centers, where human operators undertake the labor-intensive and time-consuming task of manually sorting the beverage containers (e.g., by size, and material type), and counting them to determine refund amounts. There is a need for technology that conveniently, accurately, and efficiently estimates a number or monetary value of beverage containers, and facilitates transactions involving beverage containers, including such transactions between remotely located parties.

SUMMARY OF THE INVENTION

In one aspect, the present invention comprises a computer-implemented method for estimating output data comprising or based on a number of containers, the method comprising the steps of:
(a) using an object detection algorithm operating on an input digital image to detect at least one container image; and
(b) using an estimation algorithm operating on the at least one detected container image to estimate the output data comprising or based on the number of containers.

In one embodiment of the method, using the estimation algorithm comprises counting the at least one detected container image to estimate the number of containers. Thus, such embodiments may be used when the containers are not stored in a receptacle, or are visible within a receptacle.

In one embodiment of the method:
(a) the method further comprises using the object detection algorithm to classify each of the at least one detected container image in one of a plurality of container classes; and
(b) using the estimation algorithm comprises counting the number of detected container image classified in each of the container classes to estimate the number of containers classified in each of the container classes.

Thus, such embodiments may discriminate between containers in different container classes, which may have different attributes such as unit weight, monetary value, and volumetric packing density. In such embodiments, the method may determine the output data having regard to the different container classes, based on their respective container attribute data.

In one embodiment of the method:
(a) the method further comprises using the object detection algorithm to detect a receptacle image in the input digital image;
(b) the method further comprises using one of the at least one detected container images as a reference container image associated with a predetermined container dimension, $D_C$;
(c) the method further comprises determining an estimated dimension of the receptacle in the receptacle image, $D_R$, by multiplying the container dimension, $D_C$, by a scaling factor, $$\frac{P_R}{P_C},$$

where a $P_R$ is a of the detected receptacle image, and $P_C$ is a pixel dimension of the detected reference container image; and
(d) using the estimation algorithm comprises estimating the number of containers within the receptacle based on at least the estimated dimension of the receptacle, $D_R$.

Thus, such embodiments may be used where some or all of the containers are positioned within the receptacle, and not visible due to the receptacle being opaque, or being hidden behind other containers in the receptacle. In such embodiments, the method may use the estimated dimension of the receptacle, $D_R$ to estimate the volume of the receptacle by applying a predetermined volumetric formula. The number of containers may be estimated based on estimated volume of the receptacle, and attributes relating to a type of container in a container class. The attributes may be predetermined and stored in a database accessible to the computer implementing the method, and may be selected as an input from a user computer device in communication with the computer implementing the method via a communication network. The container class may relate to a notional container that reflects a mixture of more than one type of container. In embodiments of the method, the object detection algorithm may classify the detected receptacle images by different receptacle classes. In such embodiments, the method may determine the output data having regard to the different receptacle classes, based on their respective receptacle attribute data.

The above embodiment of the method may further comprise associating the reference container image with the predetermined container dimension, $D_c$, by:
(a) using the object detection algorithm to classify the reference container image in one of a plurality of container classes, each comprising container dimension information; and
(b) associating the reference container image with the container dimension information of the container class in which the reference container image is classified.

In one embodiment of the method, the method further comprises:
(a) using the object detection algorithm to detect in the input digital image a reference object image for a reference object having a predetermined reference object dimension, $D_O$; and (b) for each of the at least one detected container image:
  (i) determining an estimated dimension of a container, $D_C$, in the detected container image by multiplying the predetermined dimension of the reference object, $D_O$, by a scaling factor, $$\frac{P_C}{P_O},$$

where $P_C$ is a pixel dimension of the detected container image, and $P_O$ is a pixel dimension of the detected reference object image; and
  (ii) using the object detection algorithm to classify the container in the detected container image in one of a plurality of contained classes, each comprising predetermined container dimension information, by comparing the estimated dimension of the container, $D_C$, to the predetermined container dimension information.

In such embodiments, the reference object may be a distinctive recognizable marking in such as a marker on a conveyor belt for transporting the containers.

In embodiments of the method, the method further comprises receiving the input digital image from a customer computing device in communication with the computer processor via a communications network.

In embodiments of the method, the method further comprises acquiring the input digital image using a digital camera operatively connected to the computer implementing the method.

In embodiments of the method, the method further comprises transmitting the output data to one or more computing devices in communication with the computer implementing the method via a communication network so that the transmitted information can be displayed on a display device of the one or more receiving computing devices.

In embodiments, the output data may comprise the estimated number of containers. In embodiments, the output may comprise a number of receptacles as determined by counting the number of detected receptacle images. In embodiments, the output data may comprise an estimated weight of the containers, as determined by multiplying the estimated number of the containers by a unit weight of a container. In embodiments, the output data may comprise an estimated monetary value of the containers, as determined by multiplying the estimated number of the containers by a unit monetary value of the containers.

In embodiments of the method, the object detection algorithm or the estimation algorithm, or both, comprise artificial intelligence tools such as an artificial neural network (ANN). In such embodiments, the method further comprises training the ANN using the input digital image and a confirmation of the output received from a computer device in communication via a communication network with the computer implementing the method.

In another aspect, the present invention comprises a system comprising a computer processor and a computer memory comprising a non-transitory computer readable medium storing a set of instructions executable by the computer processor to implement one or a combination of embodiments of the method of the present invention, as described above. In embodiments of the system, the system may further comprise a digital camera for acquiring the input digital image, and operatively connected to the computer processor and the memory.

In another aspect, the present invention comprises a computer program product comprising a non-transitory computer readable medium storing a set of instructions executable by a computer processor (and a digital camera, if present) to implement one or a combination of embodiments of the method of the present invention, as described above.

BRIEF DESCRIPTION OF THE DRAWINGS

In the drawings shown in the specification, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

DETAILED DESCRIPTION OF PREFERRED EMBODIMENT

Definitions

Figure 1:
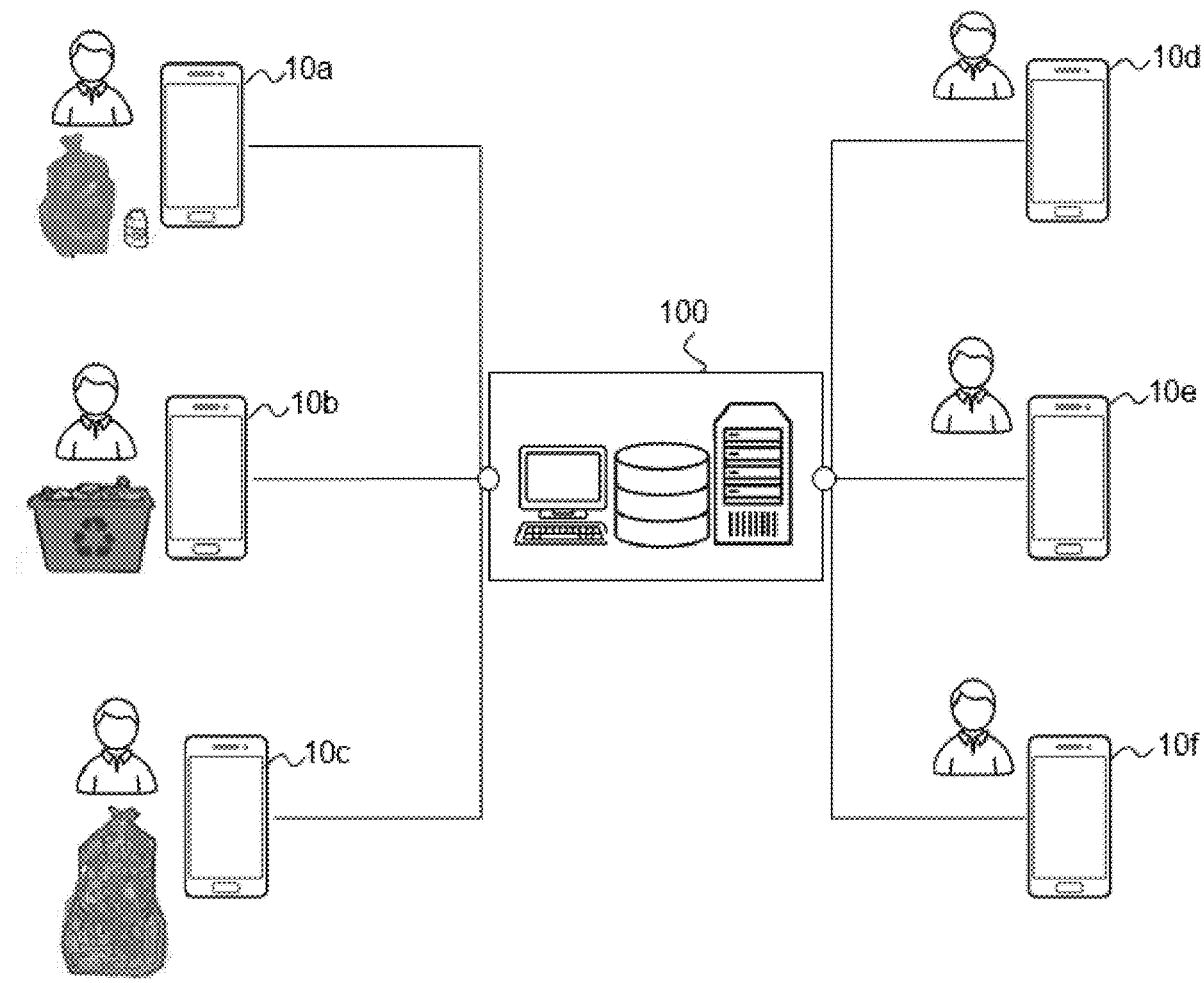
FIG. 1 shows an embodiment of a system of the present invention in communication via a communication network with a plurality of customer computers.

Any term or expression not expressly defined herein shall have its commonly accepted definition understood by a person skilled in the art. As used herein, the following terms have the following meanings.

"Container" refers to any device for storing a liquid. In non-limiting embodiments, a container may be a bottle, a can, a carton (e.g. a carton having a gable top shape, or a Tetra Pak™ carton), a jug, or a pouch. In non-limiting embodiments, a container may be made of one or more materials such as metal (e.g., aluminum), glass, paper, or plastic.

"Container class" refers to a type of container as defined by a set of attributes such as size, weight, monetary value, and volumetric packing density in a receptacle.

"Receptacle" refers to any device for storing one or more containers. In non-limiting embodiments, a receptacle may be a bag, a box, or a bin. In non-limiting embodiments, a receptacle may be made of either an opaque material, or a transparent material.

"Receptacle class" refers to a type of receptacle as defined by a set of attributes such as a shape, one or more dimensions, and volume formula defining its volumetric capacity. As non-limiting examples: a "garbage/recycle bag" receptacle class may be associated with a substantially cylindrical shape of radius, r, and height, h, and a volume formula of $V=\pi \times r^2 \times h$; a "rectangular bin" receptacle class may be associated with a substantially rectangular prismatic shape of width, w, length, l, and height, h, and a volume formula of $V=w \times l \times h$; and a "cubic bin" receptacle class may be associated with a substantially cube shape of side length, l, and a volume formula of $V=l^3$.

"Computer", "computer processor", "computer device", and like terms refer to one or more devices capable of performing operations on data in electronic form. In non-limiting embodiments, a computer may comprise a device commonly referred to as a server, general purpose computer, personal computer, desktop computers, laptop computer, handheld computer, tablet, smart phone, and the like. A computer may comprise a single physical device, or multiple physical devices operatively connected to each other (e.g., a multiple computers in a network).

"Computer readable medium" or "CRM" refers to a non-transitory, tangible medium capable of encoding data in a format readable by a computer. In non-limiting embodiments, a CRM may comprise magnetic media (e.g., a magnetic diskette or tape), optical media (e.g., an optical disc), and solid-state media using integrated circuits (e.g., flash memory).

"Communications network" refers to a network, whether wired and/or wireless, that allows electronic communication of data between computers. In non-limiting embodiments, a communication network may comprise the Internet, an intranet, a local area network, a wide area network, a telephone network, a cellular network, or a combination of the foregoing.

"Digital image" refers to a collection of numeric data in a format that can be processed by a computer to generate an image on a display device. In non-limiting embodiments, a digital image may be a raster image in a file format such as JPEG, GIF, PNG, TIFF, BMP, and the like. In non-limiting embodiments, a digital image may be a single digital image acquired alone, or acquired as one or more frames of a digital video. In non-limiting embodiments, a digital image may provide spatial information in either two-dimensions (2D) or in three-dimensions (3D).

"Object detection algorithm" refers to a set of instructions that are executable by a computer to implement a method of detecting an instance of a semantic object (e.g., a container, or a receptacle) in a digital image. An object detection algorithm may employ one or a combination of approaches known in the art of object detection. In non-limiting embodiments, such approaches may include appearance-based methods that compare a subject digital image to one or more sample images of an object to be detected, or feature-based methods that detect one or more features in the digital image that are associated with the object to be detected.

"Artificial neural network" or "ANN" refers to a computational model comprised of elements (commonly referred to as "neurons") that receive inputs and change their state (activation) based on the inputs to produce an output, wherein the elements and/or their mathematical relationship with each other may change in accordance with a learning rule so that, for a given input, the actual output of the model more closely approaches a favored output.

Non-limiting exemplary embodiments of the present invention are described below with reference to the accompanying drawings.

Overview

FIG. 1 shows an exemplary use of an embodiment of a system (100) of the present invention. In FIG. 1, the system (100) is notionally represented by icons for a desktop computer, a database, and a server, but in embodiments the system (100) may have different computer components, and a fewer or greater number of computer components.

In FIG. 1, the system (100) is in communication via a communication network comprising the Internet (as shown by the line connections) with six customer computers (10a to 10f), but in on other exemplary uses, the system (100) may be in communication with a different number of customer computers (10) using different types of communication networks. In FIG. 1, each of the customer computers (10) is in the form of a smartphone that include an integrated digital camera. In other exemplary uses, the customer computers (10) may not have an integrated digital camera, but may be operatively connected to a physically discrete digital camera to receive a digital image. In embodiments, the customer computers (10) may run a software application (or "app") that generates a graphical user interface (GUI), or run a general purpose web browser that presents a webpage with a GUI, where the GUIs are configured to facilitate implementation of the method of the present invention.

In FIG. 1, three of the customer computers (10a, 10b, 10c) are used by three different customers who have stored numerous containers in receptacles in the form of an opaque garbage bag, an opaque recycling bin, and a transparent recycling bag, respectively. These customers may be interested in selling their containers in exchange for monetary payment or otherwise disposing of the containers, but do not necessarily know the number of containers they have. The other three customer computers (10d, 10e, 10f) are used by three different customers who are interested in acquiring the containers. For example, these customers may be interested in purchasing the containers for monetary payment at a price discounted from the refund value of the containers at a redemption center. Alternatively, the customer computers (10d, 10e, 10f) may be used by organizations that are interested in receiving the containers as a donation, such as in a "bottle drive" for fundraising purposes, and redeeming refunds for the containers at a redemption center. Alternatively, the customer computers (10d, 10e, 10f) may be used by an operator of a redemption center.

In FIG. 1, the digital cameras used to generate the input digital images used in the method of the present invention are physically integral with the customer computers (10a, 10b, 10c) (smartphones). In other embodiments, the digital cameras may not be physically integral with the customer computers (10a, 10b, 10c). For example, the customer may use a standalone digital camera to acquire the input digital image on a memory, and then transfer the memory to the customer computer (10a, 10b, 10c). In FIG. 1, the customer computers (10a, 10b, 10c) and the system (100) may be remotely located from each other, and in a client-server relationship. In other embodiments, the input digital image used in the method of the present invention may be acquired using a digital camera that is local to the system (100), without the interaction of customer computers (10a to 10c). For example, the system (100) in conjunction with an operatively connected digital camera may be installed as part of a terminal at a redemption center, such as described in Example 4, below.

System.

The system (100) of the present invention comprises a computer processor and a memory comprising a non-transitory computer readable medium that stores a set of instructions that are executable by the processor to implement an embodiment of a method of the present invention. Accordingly, the system (100) is specifically configured to implement the method.

Figure 2:
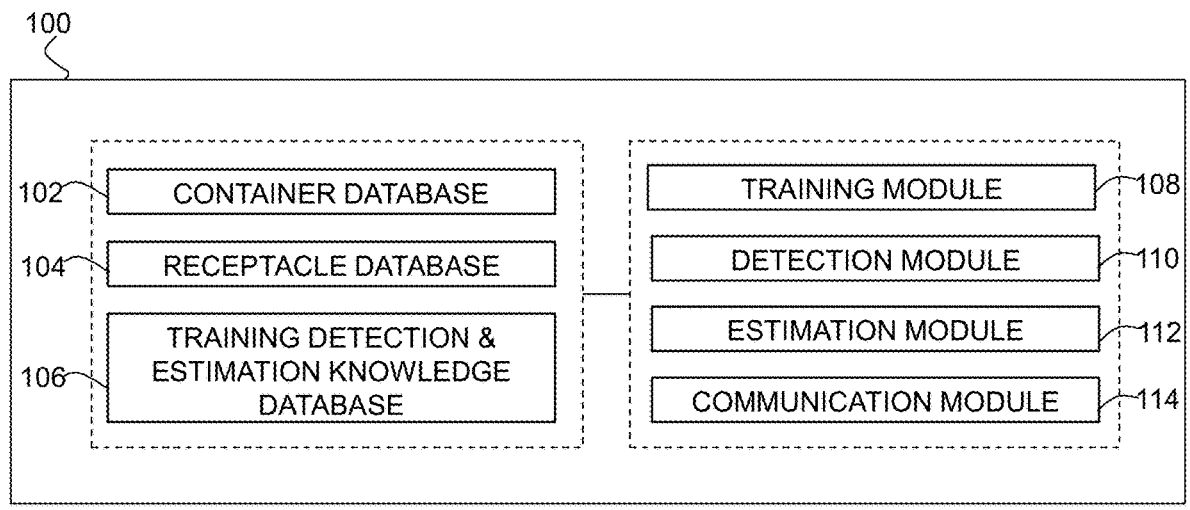
FIG. 2 is a functional block diagram of an embodiment of a system of the present invention.

FIG. 2 shows a functional block diagram of an embodiment of a system (100) of the present invention showing various databases or modules, which may be implemented by computer hardware, software, or a combination of hardware and software. The system (100) may be partly or fully implemented by hardware and software components that are different than the customer computers (10a to 10f), or by hardware and software components that form part of the customer computers (10a to 10f). For instance, certain software components that implement the system may reside in an app installed on the customer computers (10a to 10f).

The container database (102) may be used to store predetermined functions, routines, or data associated with a container class. As non-limiting examples, the container database (102) may store attribute data for the following container classes: a "can: aluminum, 375 mL" container class associated with a weight of about 15 grams per container, a monetary value of about $0.10 per container, height of 123 mm, diameter of 66 mm, and a volumetric packing density of 2.4 containers per liter; and a "bottle: plastic, 2 L" container class associated with a weight of about 55 grams per container, a monetary value of $0.25 per container, a height of 336 mm, a diameter of 102 mm, and a volumetric packing density of 0.4 containers per liter. The container database (102) may include predetermined information for other container classes as differentiated by container attributes such as size, material, color, shape, condition (e.g., undeformed, as opposed to crushed or deformed), and so forth, or mixtures of different container types. For instance, further non-limiting examples of container classes may include: "bottle: glass, volume <1 L", "bottle: glass, volume >=1 L", "carton: milk", "carton: juice", "mixture: cans (80%) and bottles (20%)", "mixture: cans (50%) and bottles (50%)", "cans: aluminum 375 mL, crushed or deformed", and so forth, as necessary.

Further, the container database (102) may store predetermined data for container classes that is specific to different geographic regions. For example, on account of differences in deposit-refund programs in different jurisdictions, the monetary value associated with a particular type of container in one geographic region may differ from the monetary value associated with the same type of container in another geographic region. As another example, on account of differences in standardized containers used in different jurisdictions, the unit weight associated with a particular type of aluminum can in one geographic region may differ from the unit weight associated with a similar type of aluminum can in another geographic region. The applicable geographic region may be determined from the data received from the customer computers (10a to 10c). This data may be manually input by the customer using the customer computer (10a to 10c), or may be automatically determined from data indicative of geolocation that is generated by the customer computer (e.g., IP address data, or GPS data) as known in the art.

The receptacle database (104) may be used to store predetermined functions, routines, or data associated with a receptacle class. As non-limiting examples, the receptacle database (104) may store attribute data for a "bag: opaque" receptacle class associated with a substantially cylindrical shape of radius, r, and height, h, and a volume formula of $V=\pi \times r^2 \times h$, a "bin: rectangular" receptacle class associated with a substantially rectangular prismatic shape of width, w, length, l, and height, h, and a volume formula of $V=w \times l \times h$, and a "bin: cube" receptacle class associated with a substantially cube shape of side length, l, and a volume formula of $V=l^3$. The container database may include predetermined information for other receptacle classes corresponding to different receptacle types. For instance, further non-limiting examples of receptacle classes may include: "bag: transparent"; "bin: cylindrical", and so forth, as necessary.

The training detection and estimation knowledge database, hereinafter, the "knowledge database" (106) may be used to store input to and outputs from the training, detection and estimation modules, that are used to train an artificial neural network of an object detection algorithm and/or an estimation algorithm, as described below.

The training module (108) performs operations for the training stage of the method as described below.

The detection module (110) performs operations for the detection stage of the method as described below. The detection module (110) is configured with an object detection algorithm. In an embodiment, the object detection algorithm may comprise an artificial neural network to improve the accuracy of its results, in a semi-automated or fully automated manner. A variety of object detection algorithms that employ artificial neural networks are known to persons skilled in the art of digital image analysis, and may be suitably adapted for use in the present invention. In an exemplary embodiment, the object detection algorithm is implemented using Faster R-CNN™ in combination with TensorFlow™. Faster R-CNN™ is an open source software that uses deep convolutional artificial neural networks for image detection (see Shaoqing Ren, Kaiming He, Ross Girshick, Jian Sun (2016 Jan. 6), "Faster R-CNN: Towards Real-Time Object Detection with Region Proposal Networks, version 3", available online from https://arxiv.org/pdf/1506.01497.pdf; and R. Girshick (2015 Dec. 7-13), "Fast R-CNN", IEEE International Conference on Computer Vision (ICCV), 2015). TensorFlow™ (Google Brain Team; Mountain View, Calif.) is an open source software library (available at www.tensorflow.org), which may be used for dataflow programming of artificial neural networks. In one embodiment, the object detection algorithm is implemented using Mask R-CNN™, which extends Faster R-CNN™ by predicting an object segmentation mask in parallel with bounding box recognition for object detection. (See Kaiming He, Georgia Gkioxari, Piotr Dollár, Ross Girshick (2017 Mar. 20), "Mask R-CNN", available online from https://arxiv.org/pdf/1703.06870.pdf). The use of such masking approaches may allow for better object detection capabilities than bounding box approaches alone.

The estimation module (112) performs operations for the estimation stage of the method as described below. The estimation module (112) is configured with an estimation algorithm for estimating an output data comprising or based on the number of containers such as their monetary value. In an embodiment, the estimation algorithm may comprise an artificial neural network to improve the accuracy of its results in a semi-automated or fully automated manner.

The communication module (114) performs operations for transmitting to and receiving data from customer computers (10a to 10f) via a communications network, as may be necessary when implementing embodiments of the method of the present invention.

Method.

The method of the present invention includes a series of computer-implemented steps. For convenient description of an embodiment of the method, the steps may be conceived as forming part of a training stage, a detection stage, and an estimation stage as discussed below.

Training Stage.

A purpose of the training stage is to train the object detection algorithm and/or estimation algorithm, and thereby prepare the knowledge database (106) so that the results of the detection stage and/or estimation stage have a satisfactory level of accuracy and reliability. Although the training stage is initially performed to initiate the system (100), the training stage may be repeated with use of the system (100), after implementing the detection stage and/or estimation stages and storing their results in the knowledge database (106), with a view to further improving the accuracy and reliability of the results produced by these stages.

Figure 3:
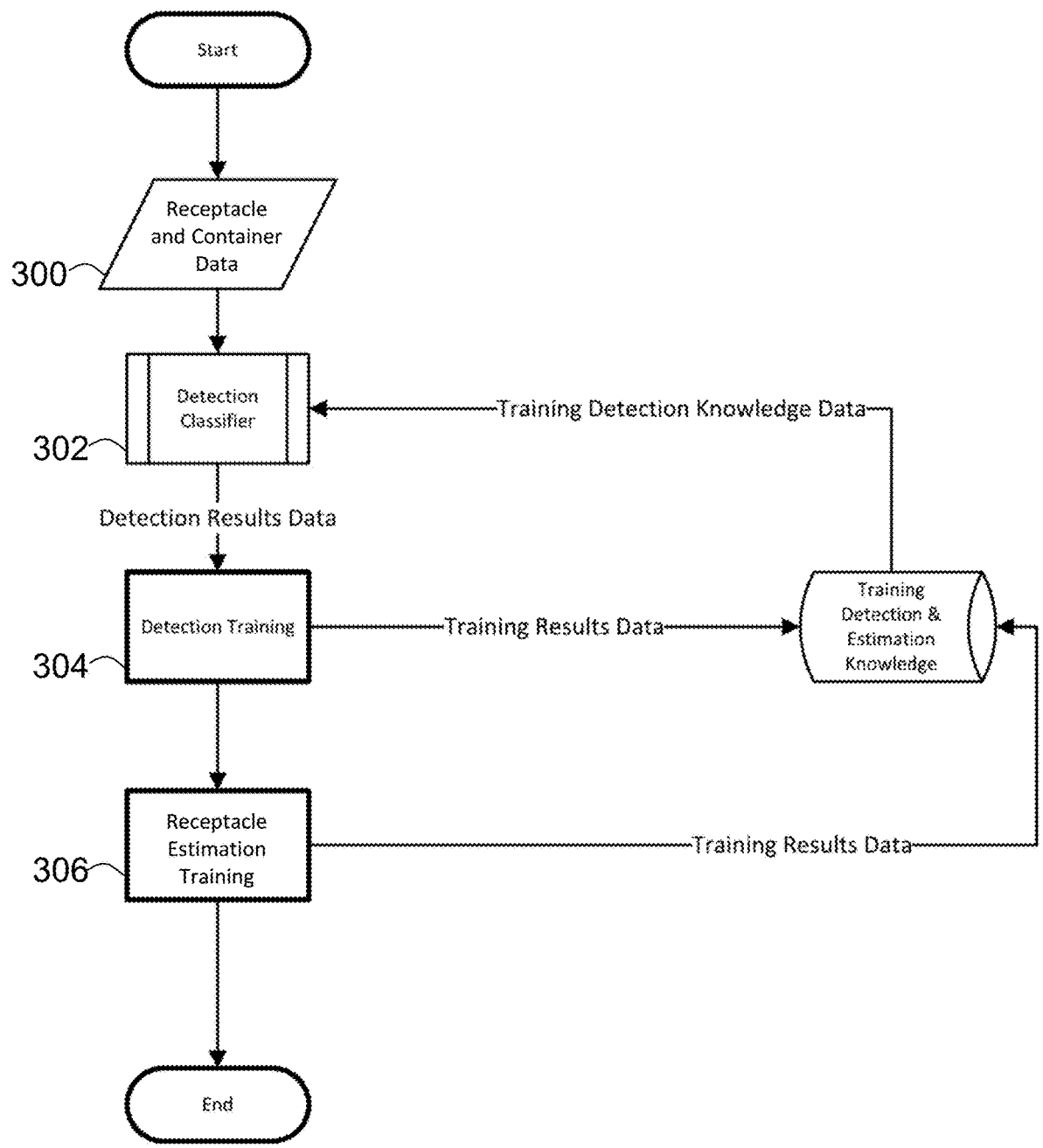
FIG. 3 is a flow chart for a training stage of an embodiment of a method of the present invention.
Figure 4:
FIG. 4 shows an example of a digital image of a receptacle containing containers, used in a training stage of an embodiment of a method of the present invention.

FIG. 3 is a flow chart for an embodiment of a training stage in an embodiment of a method of the present invention. In this embodiment, the training stage begins by creating container and receptacle data to initialize the knowledge database (106) (step 300). In this step, an operator of the system (100) creates a list of receptacle classes and container classes, which are to be detected during use of the system (100). Next, the operator annotates a plurality of sample digital images by drawing bounding boxes around receptacle images and container images, and assigning labels of receptacle or container classes to them. For example, FIG. 4 shows a sample digital image in which the operator has drawn one bounding box (300) around one receptacle image (shown as a transparent recycling bag) annotated with the "jar" receptacle class, and bounding boxes (302a, 302b, 302c) around three container images (shown as aluminum cans) annotated with the "can" container class. The sample digital images and their operator-applied annotations are stored in the knowledge database (106) as a serialized file of binary data.

In this embodiment, the training stage continues by allowing the object detection algorithm to operate on the sample digital images in the knowledge database (106) to detect receptacle images and container images therein (step 302). The artificial neural network associated with the object detection algorithm uses the results of the object detection algorithm in conjunction with the serialized file to "train" the object detection algorithm (step 304). As the object detection (step 302) and training (step 304) stages are repeatedly performed, the object detection algorithm is expected to improve in its accuracy of detecting and classifying receptacle images and container images.

Figure 5:
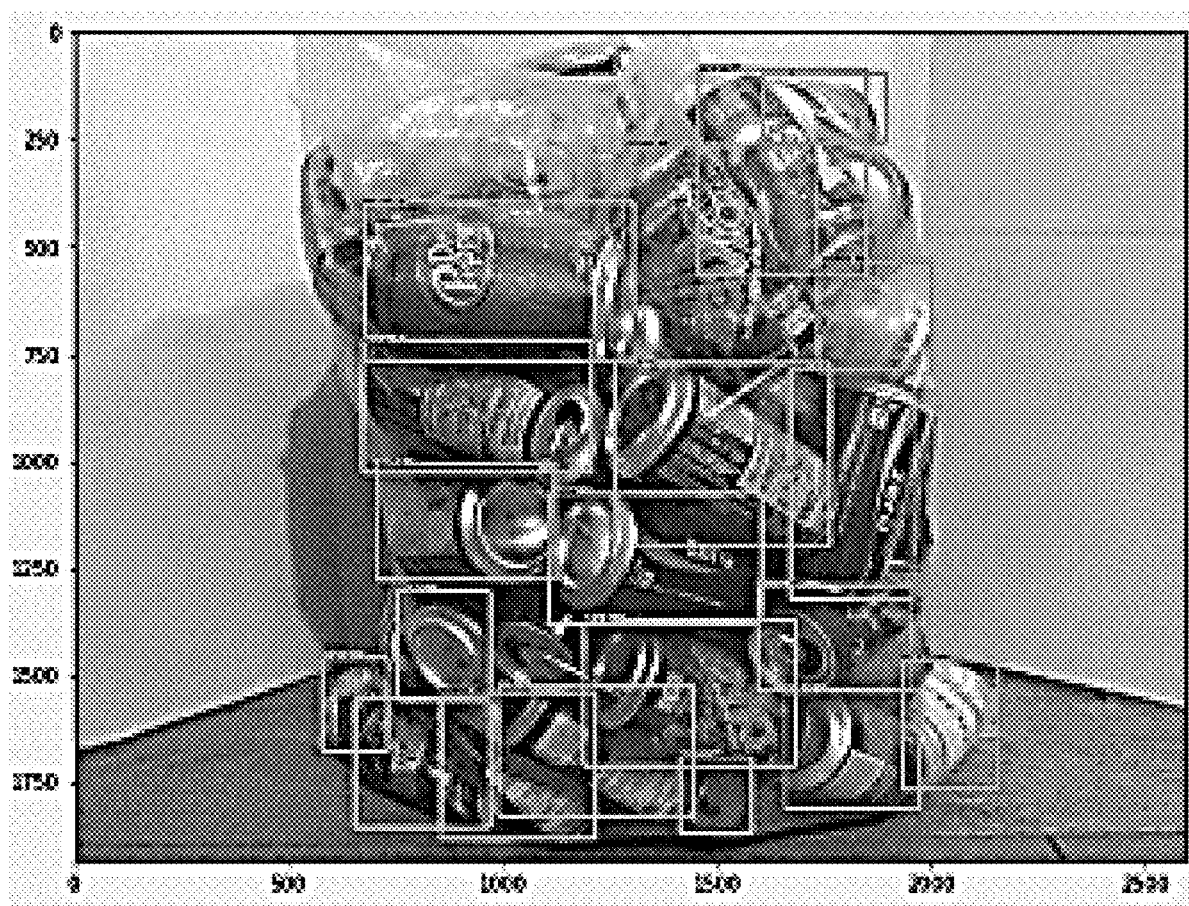
FIG. 5 shows an example of a digital image of containers, which were detected in the training stage of an embodiment of a method of the present invention.
Figure 6:
FIG. 6 shows an example of a digital image of containers, which were detected in the training stage of an embodiment of a method of the present invention.
Figure 7:
FIG. 7 shows an example of a digital image of containers, which were detected in the training stage of an embodiment of a method of the present invention.

FIGS. 5 to 7 show examples of detected container images during a training stage in an embodiment of a method of the present invention. FIG. 5 shows the same digital image as FIG. 4. In comparison with FIG. 4, FIG. 5 shows that the object detection algorithm has detected numerous additional "can" class container images, as shown with additional bounding boxes. The digital image of FIG. 6 shows that the object detection algorithm has detected five "bottle" class container images, as shown within the bounding boxes. The digital image of FIG. 7 shows that the object detection algorithm has detected ten "can" class container images, as shown within the bounding boxes.

The training stage may be performed until the object detection algorithm is capable of detecting digital images of receptacles and containers with a satisfactory level of accuracy. As non-limiting examples, a satisfactory level of accuracy may be an error rate of less than ten percent or five percent, as measured as a percentage of container images that the object detection algorithm fails to detect or detects but incorrectly classifies in a container class. In other embodiments, an acceptable error rate may be in the range of 3 percent to 25 percent, but it will be understood that the present invention is not limited by any particular error rate. Typically, the error rate of the object detection algorithm is expected to incrementally decrease with as the number of sample images used in the training stage increases and the number of training runs increases. The method is then ready to proceed to the detection stage. In this embodiment, the training stage may also be used to improve the accuracy of the estimation algorithm used during the estimation stage, with the use of an associated artificial neural network (step 306).

Detection stage. A purpose of the detection stage is to detect container image(s) and possible receptacle image(s) within an input digital image provided by a customer using the system (100). The input digital image may have detectable container images without any detectable receptacle image (see Example 4 below). Alternatively, the digital image may show a detectable receptacle image storing containers (see Examples 1 to 3). In this case, some or all of the containers within the receptacle may be visible or may not be visible. The only requirement is that the digital image include at least one visible detectable container image so that it can be used as a reference container image to estimate the dimensions of the receptacle, as described below in the estimation stage.

Figure 8:
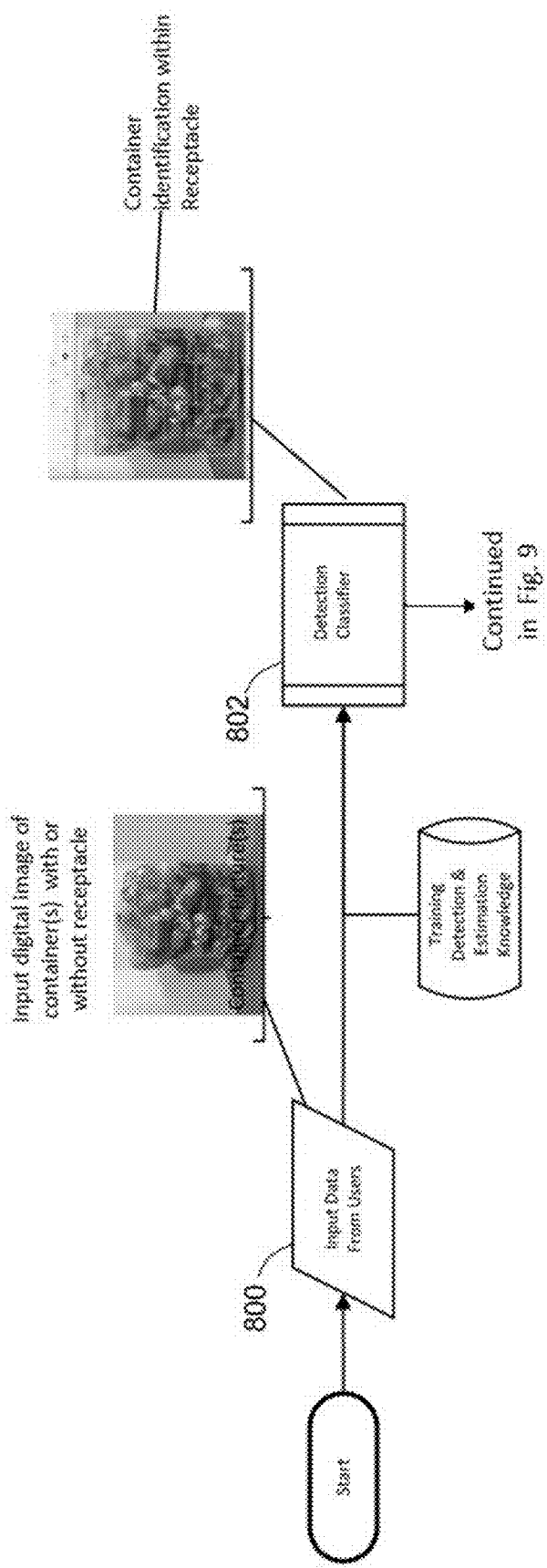
FIG. 8 is a flow chart for a detection stage of an embodiment of a method of the present invention.

FIG. 8 is a flow chart for an embodiment of a detection stage in an embodiment of a method of the present invention. In this embodiment, the detection stage begins with receiving an input digital image (step 800). As a non-limiting example, the system (100) may receive the input digital image from one of the customer computers (10a to 10c) via the Internet. As another non-limiting example, the system (100) may receive the input digital image from digital camera that is directly and operatively connected to the system (100).

In this embodiment, the detection stage continues with the object detection algorithm (using the knowledge database (106)) operating on the input digital image to detect container image(s), and receptacle image(s) if present within the input digital image (step 802).

Estimation Stage.

A purpose of the estimation stage is to estimate the output data comprising or based on a number of the containers, based on the detected digital images of containers, and detected digital images of receptacles (if any) resulting from the detection stage of the method. In embodiments, the estimation stage may also determine the number of receptacles. In embodiments, the estimation stage may also estimate other output data based on the estimated number of containers, such as an estimated weight or monetary value of the containers.

Figure 9:
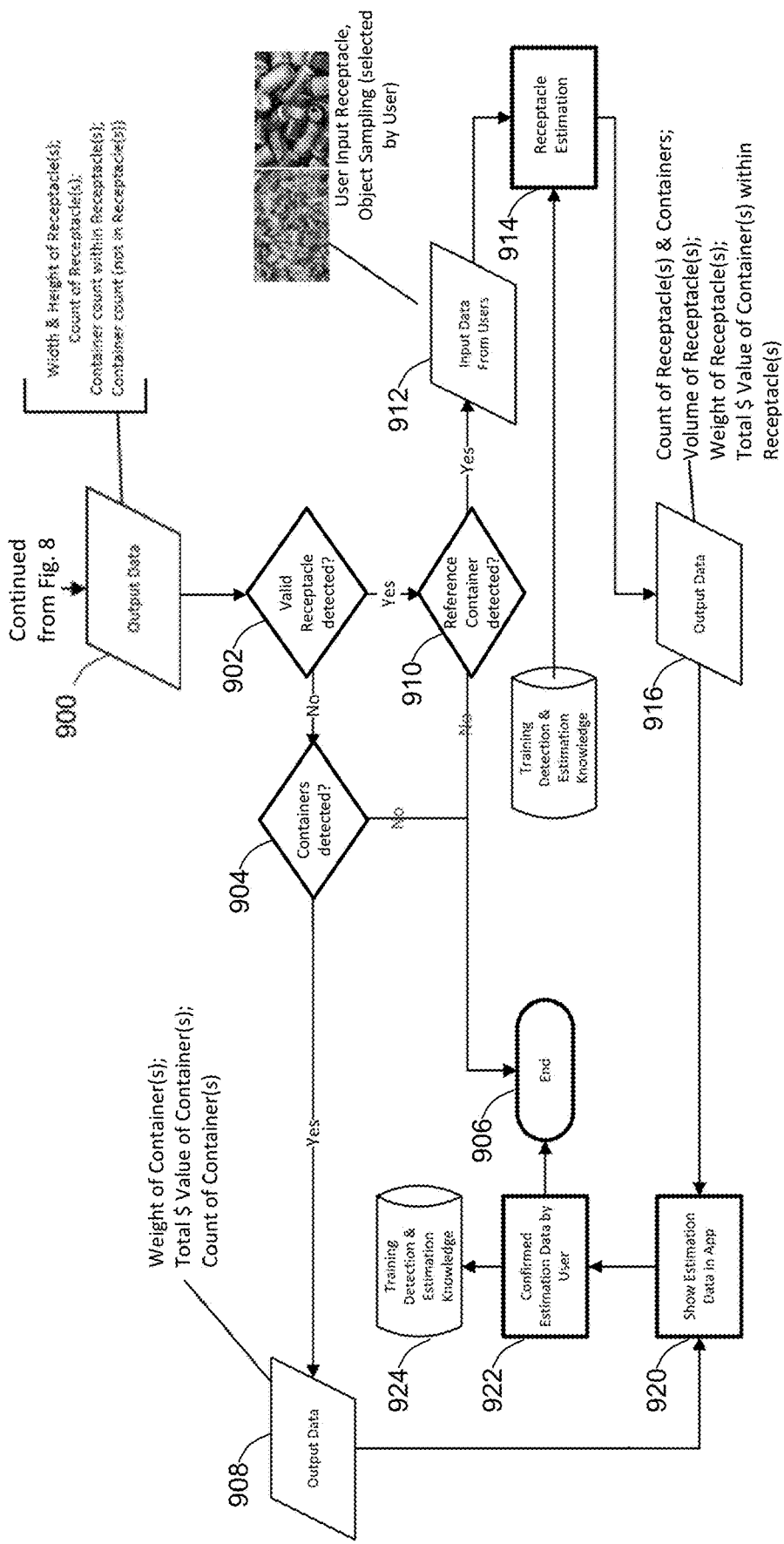
FIG. 9 is a flow chart for an estimation stage of an embodiment of a method of the present invention.

FIG. 9 is a flow chart for an embodiment of an estimation stage in an embodiment of a method of the present invention. In this embodiment, the estimation stage begins by processing the detected container image(s), and receptacle images (if any) from the detection stage to derive basic information about the images (step 900).

In this embodiment, this basic information includes the count of detected receptacle images, the count of detected container images for containers within receptacles, and the count of detected container images for containers outside of receptacles. It will be appreciated that detected container images for containers within receptacles may be differentiated from detected container images for containers outside of receptacles by mathematical analysis of whether the bounding box of a detected container image is inside or outside a bounding box of a detected receptacle image.

If the detection stage detects receptacle image(s), then the basic information also includes at least one dimension of the receptacle in the detected receptacle image. In this embodiment, the estimated dimension is used to estimate the volume of the receptacle (as described below), which is in turn used to estimate the number of containers in the receptacle. This is necessary because some or all of the containers stored in the receptacle may not be shown in the input digital image (and thus not detectable by the object detection algorithm) on account of the receptacle being made of an opaque material, or on account of the containers in the foreground of the input digital image obscuring containers in the background of the image. Also, this allows the method to be used with receptacles having unpredictable dimensions, such as flexible garbage/recycling bags that have external dimensions that vary depending on how full they are.

The relevant dimensions of the receptacle to be determined are those dimensions that define the volumetric formula associated with the applicable receptacle class in the receptacle database (104). For example, if the detection stage detects a "garbage/recycle bag" class receptacle image associated with a cylindrical shape, then the relevant dimensions are its radius, r, and, height, h. Alternatively, if the detection stage detects a "rectangular bin" class receptacle image, then the relevant dimensions are its width, w, length, l, and height, h.

The dimensions of the receptacle in the detected receptacle image may be estimated by proportional relationship between the pixel size of the detected receptacle image, and the pixel size of the detected reference container image associated with a known dimension, in accordance with generalized scaling equation [1] below, where: $D_R$ is the estimated dimension of the receptacle in a given direction; $P_R$ is the pixel dimension of the detected receptacle image in the same direction; $D_C$ is the dimension of the reference container in the same direction; and $P_C$ is the pixel dimension of the detected reference container image in the same direction.

$$D_R = D_c \times \frac{P_R}{P_c} \quad [\text{eqn. 1}]$$

For example, suppose that the detection stage detects a "garbage/recycle bag" receptacle class image having dimensions of 500×800 pixels (width× height). Further, suppose that the detection stage detects a "can" class container image having dimensions of 100×200 pixels (width× height), associated with actual dimensions of 65 mm×125 mm (diameter× height) stored in the container database (102). Accordingly, the actual radius of the receptacle can be estimated as {(65 mm×500 pixels/100 pixels)}/2=163 mm, and the height of the receptacle can be estimated as (125 mm×800 pixels/200 pixels)=500 mm.

In this embodiment of the estimation stage, the estimation stage continues by testing whether the count of detected receptacle images is non-zero (step 902). If the test result is "true", then the estimation stage proceeds with determining output data in accordance with "Case 1" below; if the test is "false", then the estimation stage proceeds with determining output data in accordance with "Case 2" below.

Case 1: Determining Output Data, without Detected Receptacle Images.

If the count of detected receptacle images is zero, then the estimation stage continues by testing whether the count of detected container images is non-zero (step 904). If the count of detected container images is zero, then the estimation stage ends (step 906), and the estimated number of containers is zero.

Otherwise, if the count of detected container images is non-zero, the estimation stage proceeds to determine output data (step 908). In this embodiment, the output data includes an estimated number of containers, which can be equated to the count of detected container images in each of the container classes.

In this embodiment, the output data also includes an estimated weight of the containers which can be determined in accordance with the below equation [2], where W is the total weight of containers, n is the number of container classes, $w_i$ is the unit weight for container class i; and, $c_i$ is the number of containers of container class i.

$$W = \Sigma_{i=1}^{n} w_i \times c_i \quad [\text{eqn. 2}]$$

In this embodiment, the output data also includes an estimated monetary value of the containers which can be determined in accordance with below equation [3], where M is the total monetary value of containers, n is the number of container classes, $m_i$ is the unit monetary value for container class i; and, $c_i$ is the number of containers of container class i.

$$M = \Sigma_{i=1}^{n} m_i \times c_i \quad [\text{eqn. 3}]$$

Case 2: Determining Output Data, with Detected Receptacle Images.

If the count of detected receptacle images is non-zero, then the estimation stage continues by testing whether the detection stage detected a reference container image (step 910). If the count of detected reference container images is zero, then the estimation stage ends (step 906), unless additional information is available about the size of the receptacle.

Otherwise, if a reference object image is detected, then the estimation stage proceeds to receive additional input data (step 912), required to estimate the number of containers. In this embodiment, the additional input data may comprise information indicative of the container class, or mixture of container classes stored in the receptacle. As a non-limiting example, upon detecting a receptacle image, the system (100) may transmit a prompt to a customer computer via the communication network to select a container class, or a mixture of container classes stored in the receptacle. As described above, each selected container class may be associated in the container database with a volumetric packing density. For example the "can: aluminum, 375 mL" container class and the "bottle: plastic, 2 L" container class may be associated with a volumetric packing density of 2.4 containers per liter, and 0.4 containers per liter, respectively.

In this embodiment, the estimation stage continues by estimating the volume of the receptacle in each detected receptacle image (step 914). In this embodiment, the estimated volume of the receptacle is based on the estimated dimension of the receptacle, $D_R$, and the volumetric formula associated with the applicable receptacle class, as described above. Continuing with the above example, it will be recalled that the estimation stage determined that a receptacle shown in a detected "garbage/recycle bag" receptacle class image had an estimated radius, r, of 162.5 mm, and an estimated height, h, of 500 mm. The volumetric formula for receptacles of this class is $V=\pi \times r^2 \times h$, from which the volume of the receptacle may be estimated as $\pi \times 163 \text{ mm}^2 \times 500 \text{ mm}=42$ liters.

Using the estimated volume of the receptacle, the estimation stage proceeds to determine output data (step 916). In this embodiment, the output data includes a number of receptacles, which can be equated to the count of detected receptacle images of all receptacle classes.

In this embodiment, the output data also includes an estimated number of containers, which can be estimated based on the estimated volume of each receptacle and the volumetric packing density of the applicable container class. Continuing with the above example, suppose that the customer indicated the detected "garbage/recycle bag" class receptacle image stored only "can: aluminum, 375 mL" class containers, which is associated with a volumetric packing density of 2.4 containers per liter in the container database (102). Therefore, the number of containers in this receptacle may be estimated as 42 liters×2.4 containers per liter=101 containers. In cases where the customer indicates that the receptacle stores a mixture of different types of containers (e.g., "mixture: cans (80%) and bottles (20%)", or "mixture: cans (50%) and bottles (50%)"), it will be understood that the estimated number of containers in the receptacle represents an estimated number of notional containers having a composite of characteristics of the different container types.

In this embodiment, the output data also includes a volume of the receptacles, as determined in step 914.

In this embodiment, the output data also includes a weight of the containers, which may be determined according to equation [2] as the sum over the container classes, of the products of the estimated number of containers and the unit weight of containers.

In this embodiment, the output data also includes a monetary value of the containers, which may be determined according to equation [3] as the sum over the container classes, of the products of the estimated number of containers and the unit monetary value of containers.

Transmission of Output Data.

In this embodiment of the estimation stage, subsequent to determining output data in accordance with either Case 1 or Case 2, above, the estimation stage continues by transmitting the output data to a computer device where so that it can be displayed on the display device (e.g., display screen or monitor) in a human-readable format (step 920). In this embodiment, the receiving computer may be the one of the customer's computers (10a, 10b, or 10c) that was used to generate and transmit the input digital image. In embodiments, the receiving computer may alternatively or also be a different customer computer, such as one of the customer computers (10d, 10e, or 10f) of a customer interested in acquiring the containers, by purchasing them or receiving them as a donation. After the customer computers (10d, 10e, or 10f) have received the output data, they may be used to receive and transmit a response to the system (100) and/or to the customer computers (10a, 10b, 10c) such as a bid price for the containers, or an indication of a willingness to accept the containers.

Confirmation of the Output Data.

In this embodiment of the estimation stage, the estimation continues with receiving a confirmation from a computer that the output data was satisfactory (step 922). In this embodiment, as an example, the system (100) may transmit a prompt to the customer computer (10a, 10b, or 10c) that was used to generate and transmit the input digital image. The prompt may require the customer to select a "yes" or "no" radio button to indicate whether the output data appears to be accurate. For example, if the customer believes that the output data provides a reasonable estimate of the number of containers, the customer would select "yes", and the output data may then be made available for transmission to other customer computers (10d to 10f). Alternatively, if the customer believes that the output data is not reasonably accurate (e.g., the number of receptacles is incorrect, or the estimated number of containers is believed to be an unreasonable overestimate or underestimate), then the customer would select "no", and the customer may be prompted to upload different input digital images, or edit input information used to estimate the number of containers. In this embodiment, the customer's confirmation (whether "yes" or "no") in conjunction with the results of the detection stage, and the output data of the estimation stage are added to the knowledge database (106) (step 924), so that they can be used in further "training" of the object detection algorithm and estimation algorithms in accordance with the training stage, as described above.

Example 1—Opaque Garbage Bag with Adjacent Reference Container

Figure 10:
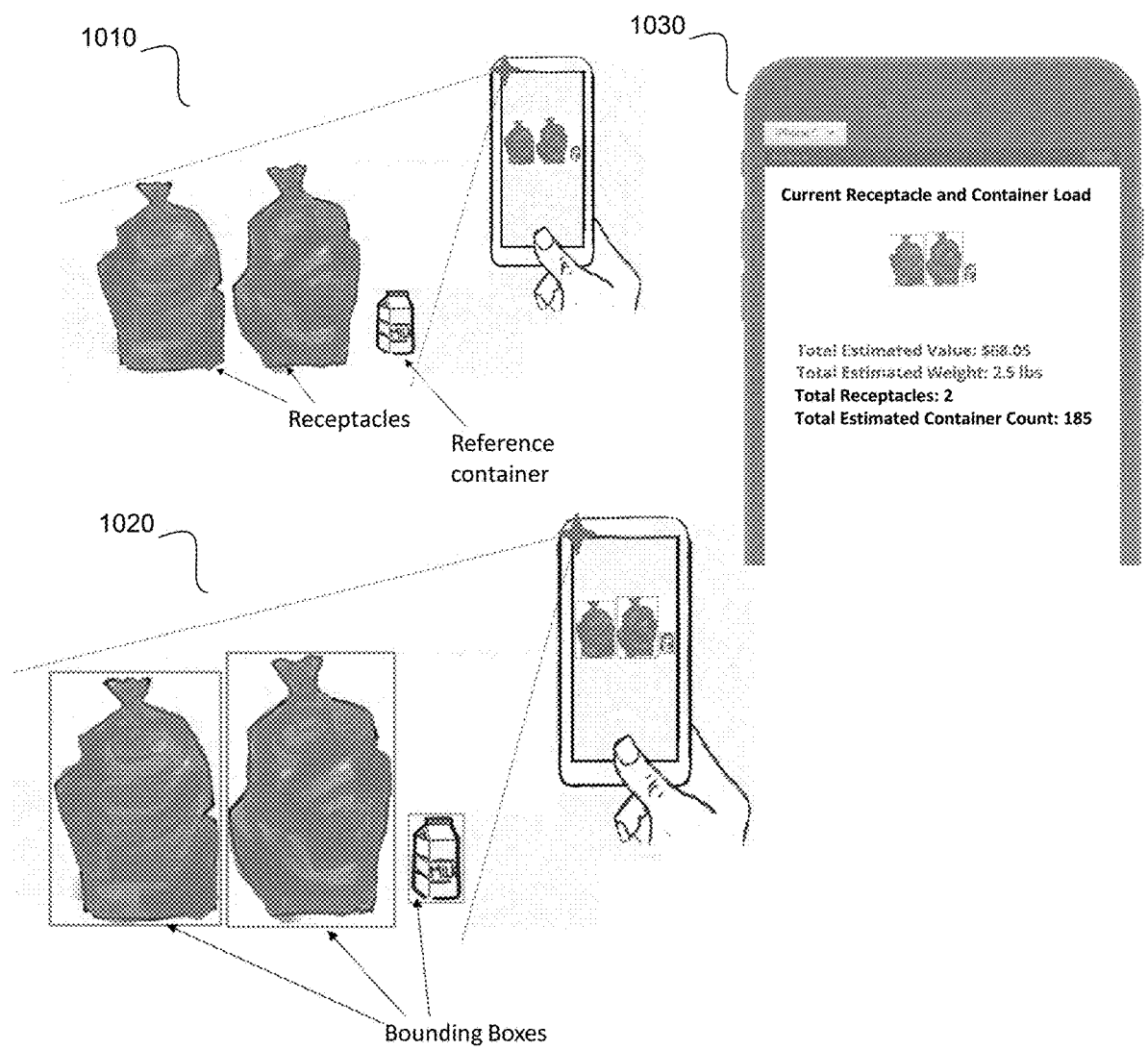
FIG. 10 is a pictorial depiction of steps in an embodiment of the method of the present invention, from the perspective of a customer who has stored containers in an opaque receptacle in the form of garbage bags.

FIG. 10 is a schematic depiction of steps of an example of the method of the present invention, from the perspective of a customer having containers stored in opaque bags. The customer uses a smartphone that has an integrated digital camera, and that runs an installed app to interface with the system (100) of the present invention. The customer has stored containers in two opaque garbage bags, and positioned a milk carton adjacent the bags to act as a reference container image. (It will be appreciated that any other type of container that can be detected in a digital image by the object detection algorithm and associated with a container class of associated with a container size may be used as a reference container.) The customer uses a smartphone to take an input digital image of the bags and milk carton (step 1010). The input digital image is uploaded via the Internet to the system (100). The system (100) proceeds to implement the detection stage of the method, and transmits to the customer computer a copy of the input digital image that has been annotated with bounding boxes around the detected "garbage bag" class receptacle images, and the detected "milk carton" container class image (step 1020). The system (100) implements the estimation stage of the method of the present invention (in accordance with Case 2 for determining the output data), and transmits to the customer computer the output data indicating the total estimated value of the containers in the bags and the total weight of the containers, along with the number of detected bags, and the estimated number of containers in the bags (step 1030).

Example 2—Opaque Recycling Bin Storing Visible Reference Container

Figure 11:
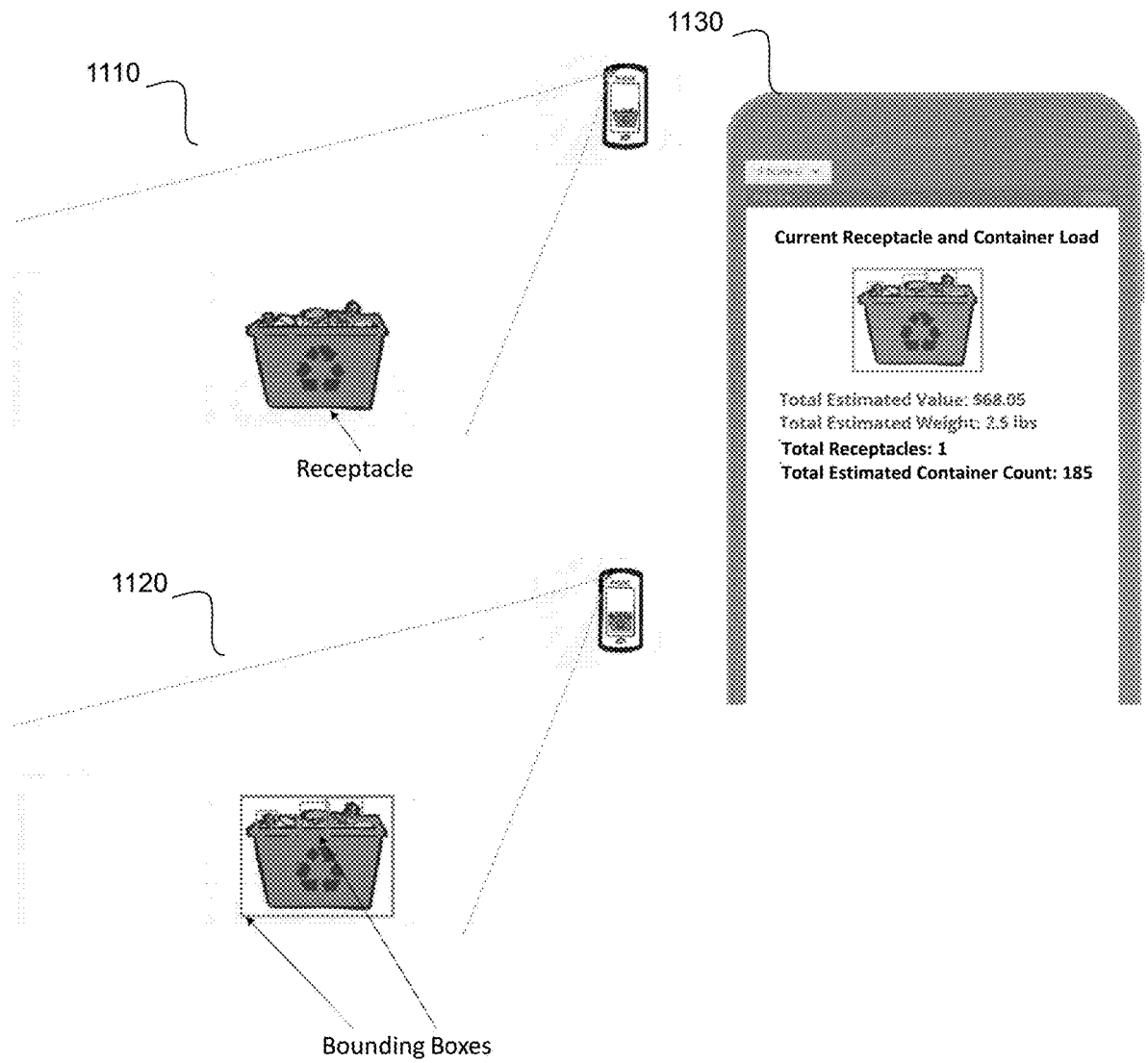
FIG. 11 is a pictorial depiction of steps of an embodiment of the method of the present invention, from the perspective of a customer who has stored containers stored in an opaque receptacle in the form of a recycling bin.

FIG. 11 is a schematic depiction of steps of an example of the method of the present invention, from the perspective of a customer having containers stored in an opaque recycling bin. In this example, steps 1110, 1120, and 1130 are analogous to steps 1010, 1020, 1030, respectively, as described in preceding example 1. However, in this example the customer has stored containers in an opaque recycling bin. Some of the containers at the top of the recycling bin are visible in the input digital image, and therefore, one or more of them may serve as a detected reference object image when implementing the estimation stage of the method.

Example 3—Containers Stored in Transparent Recycling Bags

Figure 12:
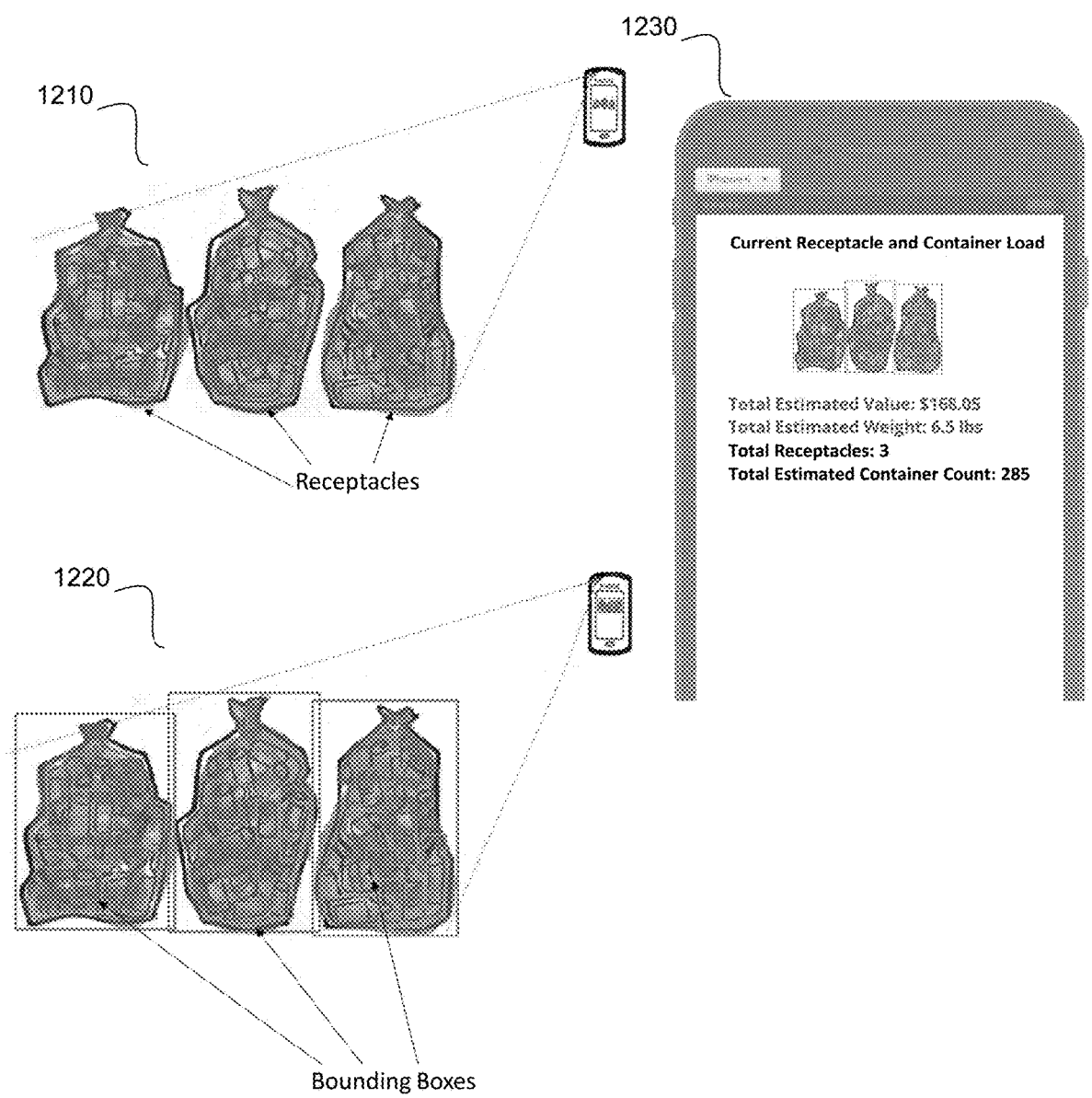
FIG. 12 is a pictorial depiction of steps of an embodiment of the method of the present invention, from the perspective of a customer who has stored containers stored in transparent recycling bags.

FIG. 12 is a schematic depiction of steps of an example of the method of the present invention, from the perspective of a customer having containers stored in transparent bags. In this example, steps 1210, 1220, and 1230 are analogous to steps 1010, 1020, 1030, respectively, as described in preceding example 1. However, in this example the customer has stored containers in a transparent recycling bag. Some of the containers in the foreground of the recycling bag are visible in the input digital image, and therefore, one or more of them may serve as a detected reference object image when implementing the estimation stage of the method.

Example 4—System Installed at a Redemption Center

Figure 13A:
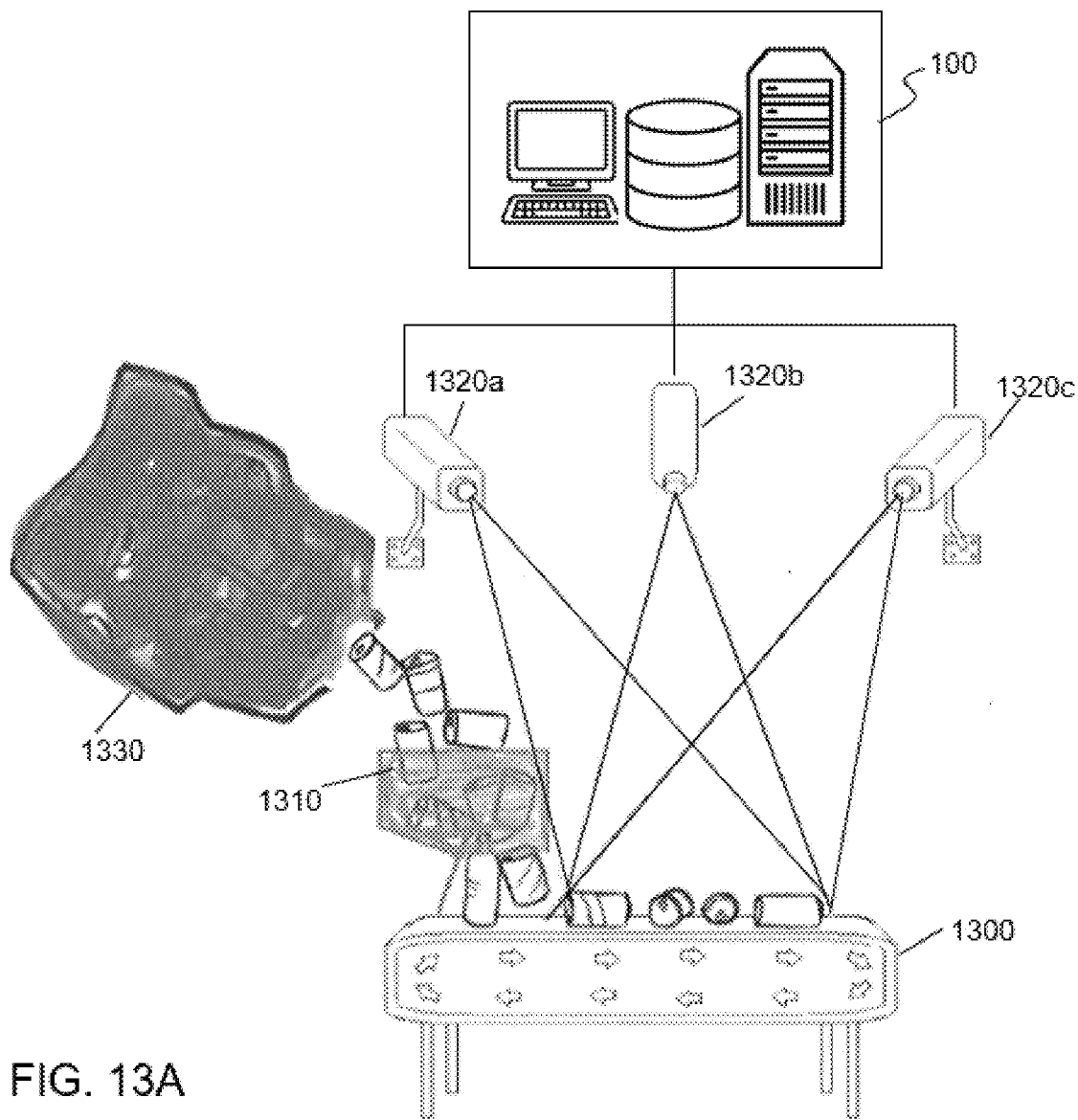
FIG. 13A shows a side view of an embodiment of a system incorporating a computer system of the present invention that may be used at a redemption center to estimate a number of containers.
Figure 13B:
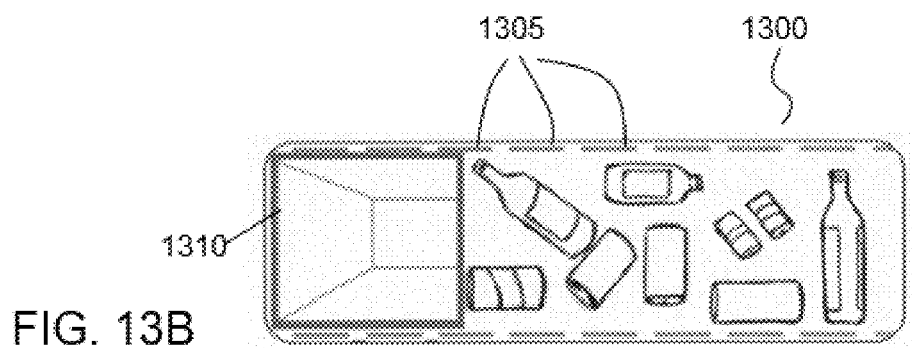
FIG. 13B shows a top view of the system of FIG. 13A.

FIGS. 13A and 13B show a side view, and a top view, respectively, of a system of the present invention that may be used at a redemption center to estimate a number of containers. The system includes a conveyor belt (1300), a chute (1310), and a plurality of digital cameras (1320a, 1320b, 1320c) operatively connected to a computer system (100) of the present invention. In use, a customer may bring a receptacle such as a garbage bag (1330) storing an assortment of container types to the redemption center. The customer empties the garage bag (1330) into the chute (1310), which deposits the containers on to the conveyor belt (1300). Preferably, the chute is configured to deposit the container on the conveyor belt (1300) in such a manner that the containers do not lie on top of each other. As the conveyor belt (1300) moves, it brings the containers into the field of view of the digital cameras (1320). The digital cameras (1320), which may be video cameras, acquire digital images of the containers on the conveyor belt. The digital cameras (1320) may be set up to acquire digital images from different perspectives to capture a more complete context of the containers including their size, volume, labels and bar codes which can be used by the object detection algorithm to help provide a higher rate of accuracy to detect the number and total value of the containers. The acquired digital images are transmitted to the computer system (100), which implements the object detection stage and the estimation stage (in accordance with Case 1 for determining the output data) of the method of the present invention. As shown in FIG. 13B, the conveyor belt (1300) may have a series of reference markings (1305). In this embodiment, the reference markings are in the form of line segments placed along the edges of the conveyor belt (1300), but in other embodiments may have other forms and locations. The line segments are of constant and known length, $D_O$, and as such, images of them can serve as a reference object images for the object detection stage of the method. The line segments appear in the digital images acquired by the conveyor belt (1300) as having a certain pixel dimension, which remains substantially constant since the digital cameras (1320) are fixed in position relative to the conveyor belt installation. The dimension of a container, $D_C$, appearing in a detected container image can be determined in estimated with equation [4], where: $P_o$ is the pixel dimension of the detected reference or marker image, and $P_C$ is the pixel dimension of the detected container image:

$$D_c = D_o \times \frac{P_C}{P_O} \quad \text{[eqn. 4]}$$

This estimated dimension of the container, $D_C$, can be used by the object detection algorithm to determine the container class for the detected container image with greater certainty or accuracy, by determining which container class has stored size information that most closely matches the estimated container size. For example, suppose that the object detection algorithm estimates the height and width of the container to be 120 mm and 65 mm, respectively. The object detection algorithm is more likely to classify such a container in the "can: aluminum, 375 mL" container class associated with stored dimensions of 123 mm×66 mm, than in the "bottle: plastic, 2 L" container class with stored dimensions of 336 mm×102 mm.

Interpretation.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The invention claimed is:

1. A computer-implemented method for estimating output data comprising or based on a number of containers, the method comprising the steps of:
   (a) using an object detection algorithm operating on an input digital image to detect at least one container image; and
   (b) using an estimation algorithm operating on the at least one detected container image to estimate the output data comprising or based on the number of containers; and
   wherein:
   (c) the method further comprises using the object detection algorithm to detect a receptacle image in the input digital image;
   (d) the method further comprises using one of the at least one detected container images as a reference container image associated with a predetermined container dimension, $D_C$;
   (e) the method further comprises determining an estimated dimension of the receptacle in the receptacle image, $D_R$, by multiplying the container dimension, $D_C$, by a scaling factor, $$\frac{P_R}{P_c},$$

where $P_R$ is a pixel dimension of the detected receptacle image, and $P_C$ is a pixel dimension of the detected reference container image; and
   (f) using the estimation algorithm comprises estimating the number of containers within the receptacle based on at least the estimated dimension of the receptacle, $D_R$.

2. The method of claim 1, wherein the method further comprises associating the reference container image with the predetermined container dimension, $D_C$, by:
   (a) using the object detection algorithm to classify the reference container image in one of a plurality of container classes, each comprising container dimension information; and
   (b) associating the reference container image with the container dimension information of the container class in which the reference container image is classified.

3. A system comprising a computer processor and a computer memory comprising a non-transitory computer readable medium storing a set of instructions executable by the computer processor to implement a method for estimating output data comprising or based on a number of containers, the method comprising the steps of:
   (a) using an object detection algorithm operating on an input digital image to detect at least one container image; and
   (b) using an estimation algorithm operating on the at least one detected container image to estimate the output data comprising or based on the number of containers wherein:
   (c) the method further comprises using the object detection algorithm to detect a receptacle image in the input digital image;
   (d) the method further comprises using one of the at least one detected container images as a reference container image associated with a predetermined container dimension, $D_c$;
   (e) the method further comprises determining an estimated dimension of the receptacle in the receptacle image, $D_R$, by multiplying the container dimension, $D_C$, by a scaling factor, $$\frac{P_R}{P_c},$$

where $P_R$ is a pixel dimension of the detected receptacle image, and $P_C$ is a pixel dimension of the detected reference container image; and
   using the estimation algorithm comprises estimating the number of containers within the receptacle based on at least the estimated dimension of the receptacle, $D_R$.

4. The system of claim 3, wherein the method further comprises associating the reference container image with the predetermined container dimension, $D_C$, by:
   (a) using the object detection algorithm to classify the reference container image in one of a plurality of container classes, each comprising container dimension information; and
   (b) associating the reference container image with the container dimension information of the container class in which the reference container image is classified.

5. A computer program product comprising a non-transitory computer readable medium storing a set of instructions executable by a computer processor to implement a method for estimating output data comprising or based on a number of containers, the method comprising the steps of:
   (a) using an object detection algorithm operating on an input digital image to detect at least one container image; and
   (b) using an estimation algorithm operating on the at least one detected container image to estimate the output data comprising or based on the number of containers;

wherein:
(c) the method further comprises using the object detection algorithm to detect a receptacle image in the input digital image;
(d) the method further comprises using one of the at least one detected container images as a reference container image associated with a predetermined container dimension, $D_c$;
(e) the method further comprises determining an estimated dimension of the receptacle in the receptacle image, $D_R$, by multiplying the container dimension, $D_C$, by a scaling factor, $$\frac{P_R}{P_c},$$

where $P_R$ is a pixel dimension of the detected receptacle image, and $P_C$ is a pixel dimension of the detected reference container image; and
using the estimation algorithm comprises estimating the number of containers within the receptacle based on at least the estimated dimension of the receptacle, $D_R$.

6. The computer program product of claim 5, wherein the method further comprises associating the reference container image with the predetermined container dimension, $D_C$, by:
(a) using the object detection algorithm to classify the reference container image in one of a plurality of container classes, each comprising container dimension information; and
(b) associating the reference container image with the container dimension information of the container class in which the reference container image is classified.

7. A computer-implemented method for estimating output data comprising or based on a number of containers, the method comprising the steps of:
(a) using an object detection algorithm operating on an input digital image to detect at least one container image; and
(b) using an estimation algorithm operating on the at least one detected container image to estimate the output data comprising or based on the number of containers; and
wherein:
(c) the method further comprises using the object detection algorithm to detect in the input digital image a reference object image for a reference object having a predetermined reference object dimension, $D_O$; and
(d) the method further comprises, for each of the at least one detected container image:
(i) determining an estimated dimension of a container, $D_C$, in the detected container image by multiplying the predetermined dimension of the reference object, $D_O$, by a scaling factor, $$\frac{P_C}{P_O},$$

where $P_c$ is a pixel dimension of the detected container image, and $P_O$ is a pixel dimension of the detected reference object image; and
(ii) using the object detection algorithm to classify the container in the detected container image in one of a plurality of container classes, each comprising predetermined container dimension information, by comparing the estimated dimension of the container, $D_C$, to the predetermined container dimension information; and
(e) using the estimation algorithm comprises counting the number of detected container images classified in each of the container classes to estimate the number of containers classified in each of the container classes.

8. A system comprising a computer processor and a computer memory comprising a non-transitory computer readable medium storing a set of instructions executable by the computer processor to implement a method for estimating output data comprising or based on a number of containers, the method comprising the steps of:
(a) using an object detection algorithm operating on an input digital image to detect at least one container image; and
(b) using an estimation algorithm operating on the at least one detected container image to estimate the output data comprising or based on the number of containers wherein:
(c) the method further comprises using the object detection algorithm to detect in the input digital image a reference object image for a reference object having a predetermined reference object dimension, $D_O$; and
(d) the method further comprises, for each of the at least one detected container image:
(i) determining an estimated dimension of a container, $D_C$, in the detected container image by multiplying the predetermined dimension of the reference object, $D_O$, by a scaling factor, $$\frac{P_C}{P_O},$$

where $P_c$ is a pixel dimension of the detected container image, and $P_O$ is a pixel dimension of the detected reference object image; and
(ii) using the object detection algorithm to classify the container in the detected container image in one of a plurality of container classes, each comprising predetermined container dimension information, by comparing the estimated dimension of the container, $D_C$, to the predetermined container dimension information; and
(e) using the estimation algorithm comprises counting the number of detected container images classified in each of the container classes to estimate the number of containers classified in each of the container classes.

9. A computer program product comprising a non-transitory computer readable medium storing a set of instructions executable by a computer processor to implement a method for estimating output data comprising or based on a number of containers, the method comprising the steps of:
(a) using an object detection algorithm operating on an input digital image to detect at least one container image; and
(b) using an estimation algorithm operating on the at least one detected container image to estimate the output data comprising or based on the number of containers; wherein:
(c) the method further comprises using the object detection algorithm to detect in the input digital image a reference object image for a reference object having a predetermined reference object dimension, $D_O$; and (d) the method further comprises, for each of the at least one detected container image:
  (I) determining an estimated dimension of a container, $D_C$, in the detected container image by multiplying the predetermined dimension of the reference object, $D_O$, by a scaling factor, $$\frac{P_C}{P_O},$$

where $P_c$ is a pixel dimension of the detected container image, and $P_O$ is a pixel dimension of the detected reference object image; and
  (ii) using the object detection algorithm to classify the container in the detected container image in one of a plurality of container classes, each comprising predetermined container dimension information, by comparing the estimated dimension of the container, $D_C$, to the predetermined container dimension information; and
(e) using the estimation algorithm comprises counting the number of detected container images classified in each of the container classes to estimate the number of containers classified in each of the container classes.

* * * * *